United States Patent [19]

Yamaoka et al.

[11] Patent Number: 4,673,055
[45] Date of Patent: Jun. 16, 1987

[54] TRANSMISSION FOR SELF-PROPELLED WORKING VEHICLES

[75] Inventors: Kojiro Yamaoka, Nishinomiya; Hideaki Okada, Takarazuka, both of Japan

[73] Assignee: Kanzaki Kokyukoki Mfg. Co., Ltd., Amagasaki, Japan

[21] Appl. No.: 865,113

[22] Filed: May 20, 1986

[30] Foreign Application Priority Data

May 28, 1985 [JP] Japan .............................. 60-79886[U]

[51] Int. Cl.⁴ ............................................ B60R 17/00
[52] U.S. Cl. ...................................... 180/336; 74/701; 74/371; 192/4 A; 192/109 F; 180/70.1
[58] Field of Search ................. 74/701, 371; 192/4 A, 192/109 F, 82 R, 85 R; 180/70.1, 336, 315

[56] References Cited

U.S. PATENT DOCUMENTS

| | | | |
|---|---|---|---|
| 3,250,341 | 5/1966 | Takahashi | 180/336 |
| 3,812,735 | 5/1974 | von Kaler et al. | 74/371 |
| 4,031,977 | 6/1977 | Grosseau | 180/336 |
| 4,103,566 | 8/1978 | von Kaler et al. | 74/701 |
| 4,148,382 | 4/1979 | Yamaoka et al. | 192/4 A |

Primary Examiner—John J. Love
Assistant Examiner—Kenneth R. Rice

[57] ABSTRACT

In a self-propelled working vehicle having a speed change mechanism wherein a plurality of change gears journaled on a shaft are coupled one at a time by key means disposed within and shiftable along the shaft, fluid-actuated clutch is provided for interrupting input of power to the speed change mechanism before shifting operations. For protecting gear-engaging clutch portion of the key means for damage, fluid pressure applied to the clutch from a disengaged condition thereof is increased gradually by a relief valve including a pressure-modulating control piston. For disengaging the clutch before shifting operations, an unloader valve is provided which is actuated by moving a speed change lever along a direction other than the key-shifting direction.

Relief valve means also acting as an unloader valve for disengaging the clutch is disclosed. Differential-locking clutch is also disclosed which is operated by fluid for actuating the clutch in the transmission path.

7 Claims, 8 Drawing Figures

TRANSMISSION FOR SELF-PROPELLED WORKING VEHICLES

FIELD OF THE INVENTION

This invention relates to a transmission which transmits power in self-propelled working vehicles for use in, by way of examples, earth-moving operation, reaping operation, article-loading operation to transport vehicles and the like.

More particularly, the present invention relates to a so-called "in-line transmission" or "linear draw key transmission" in which a plurality of change gears rotatably mounted on a transmission shaft are coupled one at a time to such shaft by a shift key slidably disposed within the shaft and having a gear-engaging clutch portion.

BACKGROUND OF THE INVENTION

Vehicle power transmission of this type is well known to the art as disclosed in, for example, U.S. Pat. Nos. 3,812,735 and 4,103,566 and is particularly suitable for use in small-scaled working vehicles because such transmission is compact in scale. Another advantage is that a transmission of this type permits a straight line shift patern so that a remote control change lever may be employed with ease.

In the past, a mechanical clutch is employed for the purpose of interrupting input of power to the transmission before a shifting operation by a change lever is performed. A typical example of such mechanical clutch is a belt-tightening clutch in which a tightening pulley in a belt drive is supported so that it may be displaced away from a belt for disactuating the belt drive.

Such mechanical clutch may damage a gear-engaging clutch portion of shift key because a mechanical clutch allows a transmission shaft, with which the shift key is associated, to be put suddenly into a normal speed rotation when the clutch is actuated or engaged again after a shifting operation. Such damage of gear-engaging clutch portion is considerable when the mechanical clutch is re-engaged after a shift-down operation too early, because inertial rotation of shaft due to a higher speed ratio rotation before such shift-down will provide a large load to the clutch portion.

Accordingly, a primary object of the present invention is to provide an improved transmission of the type set forth before in which a fluid-actuated clutch is employed in combination with a fluid supply system therefor for protecting clutch portion of a shift key from damage.

An attendant object of the invention is to provide a novel transmission in which the fluid supply system set forth above includes an unloader valve employed for controlling the operation of fluid-actuated clutch in a reliable and simple fashion.

Another attendant object is to provide a novel transmission in which the fluid supply system set forth above includes a simple valve means which controls both of fluid pressure applied to fluid-actuated clutch and operation itself of such clutch.

A furtherobject of the present invention is to provide a novel transmission in which a differential-locking clutch is employed which is operated by fluid provided from the fluid supply system set forth above.

SUMMARY OF THE INVENTION

In a transmission having a speed change mechanism which comprises a plurality of change gears rotatably mounted on a shaft, slidable key means disposed within the shaft having a clutch portion biased to move radially outwardly of the shaft for coupling the gears one at a time to the shaft, and a shift mechanism including a change lever, the present invention provides a fluid-actuated clutch which is operable to interput input of power to the speed change mechanism when disengaged. Such clutch is engaged by fluid supplied under pressure by a pump via a fluid supply path.

Relief valve means is connected to the fluid supply path for determining fluid pressure applied to the clutch. Such relief valve is particularly fashioned such that the base end of pressure-determining spring thereof is received by a control piston which is movable axially of the spring between two positions. The control piston is adapted to be moved by fluid supplied from the fluid supply path through an orifice.

Relief valve of this type is already known as disclosed in, for example, in U.S. Pat. No. 4,148,382. Such relief valve means operates, when the fluid-actuated clutch becomes engaged from its disengaged condition, to enlarge fluid pressure applied to the clutch gradually to a pretermined value.

According to the present invention, an unloader valve is further provided which is connected to the fluid supply path for the clutch. This unloader valve is operable to unload fluid pressure in the fluid path when displaced to a pressure-unloading position. The unloader valve is displaced by the change lever set forth before. For this, such lever is supported so that it is movable along a first direction other than a second direction along which the lever is moved for shifting the key means. The unloader valve is connected operatively to the change lever so as to be displaced to the pressure-unloading position by a movement of the lever along the first direction referred to above. Such connection between the change lever and unloader valve may be achieved simply by providing a cam means which is actuated so as to displace the unloader valve when the change lever is moved along the first direction, that requires no linkage between the lever and valve.

When shifting operation as to the speed change mechanism is performed, the change lever is firstly moved along the first direction so as to displace the unloader valve to its pressure-unloading position. By this, fluid pressure in the clutch-actuating fluid supply path and, therefore, fluid pressure applied to the clutch is unloaded resulting in disengagement of the clutch. Such unloading of fluid preasure will also cause a movement of the control piston set forth before towards a direction such that biasing force of the pressure-determining spring of the relief valve is reduced.

The change lever is then moved along the second direction referred to before so as to disconnect a change gear from the shaft and to couple a fresh change gear to the shaft by key means or the clutch portion thereof. The lever is then moved along the first direction so as to return the unloader valve to its original or rest position.

From this point of time, control piston of the relief valve means is supplied with fluid from the clutch-actuating fluid supply path through the orifice set forth before. Such control piston is thus gradually moved towards the pressure-determining spring so as to enlarge the biasing force of such spring gradually. Consequently, fluid pressure applied to the clutch is enlarged gradually to a predetermined value. The fluid-actuated clutch is thus engaged from a disengaged condition in a manner such that it becomes firstly in a slipping engagement condition and is then brought gradually into a full engagement condition. It is thus seen that torque transmitted to the speed change mechanism is increased gradually to a normal value. Such gradual increase of torque transmitted to the speed change mechanism after a shifting operation therefor well protects the clutch portion of shift key means so as not to cause a damage of the clutch portion.

The change lever movable along the first and second directions is preferably guided by a lever guide having guide means which permits a movement of the lever along the second direction, namely key-shifting direction, only when such lever has been moved along the first direction so as to displace the unloader valve to the pressure-unloading position. Such guide will require a clutch-disengaging operation prior to a speed change operation by the change lever and thus enhances a reliability of operation.

Unloader valve operated by the speed change lever provides a simple and reliable controlling means for the fluid-actuated clutch.

In a preferred embodiment, such unloader valve is provided by valve spool of the relief valve means which spool is biased by the pressure-determining spring and controls fluid communication between inlet and outlet ports of the relief valve for establishing a fluid pressure corresponding to the biasing force of pressure-determining spring. For accomplishing such simple valve structure, cam means is provided which engages at one end thereof to the valve spool from a direction opposite to the pressure-determining spring. This cam means is fashioned such that, when the change lever is moved along the second direction set forth before, it causes a displacement of the valve spool to a position where an unristricted fluid communication between the inlet and outlet ports of relief valve is attained.

Vehicle power transmission usually includes a differential gearing. Working vehicle which is often travelled on earth of bad conditions requires a differential-locking clutch. In an aspect of the present invention, such locking clutch is provided by a fluid-operated clutch which is operated by fluid supplied from the fluid supply path set forth before via a branch path having therein a throttle. The throttle will prevent the fluid-actuated clutch in the transmission path from a possible slipping or disengaging due to a drop in fluid pressure when the fluid-operated locking clutch is operated.

Such throttle may be incorporated in a control valve for controlling operation of the locking clutch. When this is done, the throttle may further be fashioned into a variable area throttle the flow area of which may be varied by displacing the control valve. A variable area throttle permits to control differential-limiting operation of the locking clutch.

BRIEF DESCRIPTION OF THE DRAWINGS

Another features of the present invention and its attendant advantages will become readily apparent from the descriptions of the embodiments shown in the drawings in which.

DESCRIPTION OF PREFERRED EMBODIMENTS

Referring now to the drawings in which like numerals designate like parts throughout the several views thereof, there is shown a first preferred embodiment of the transmission according to the present invention in FIGS. 1 to 5.

Figures 1, 5:
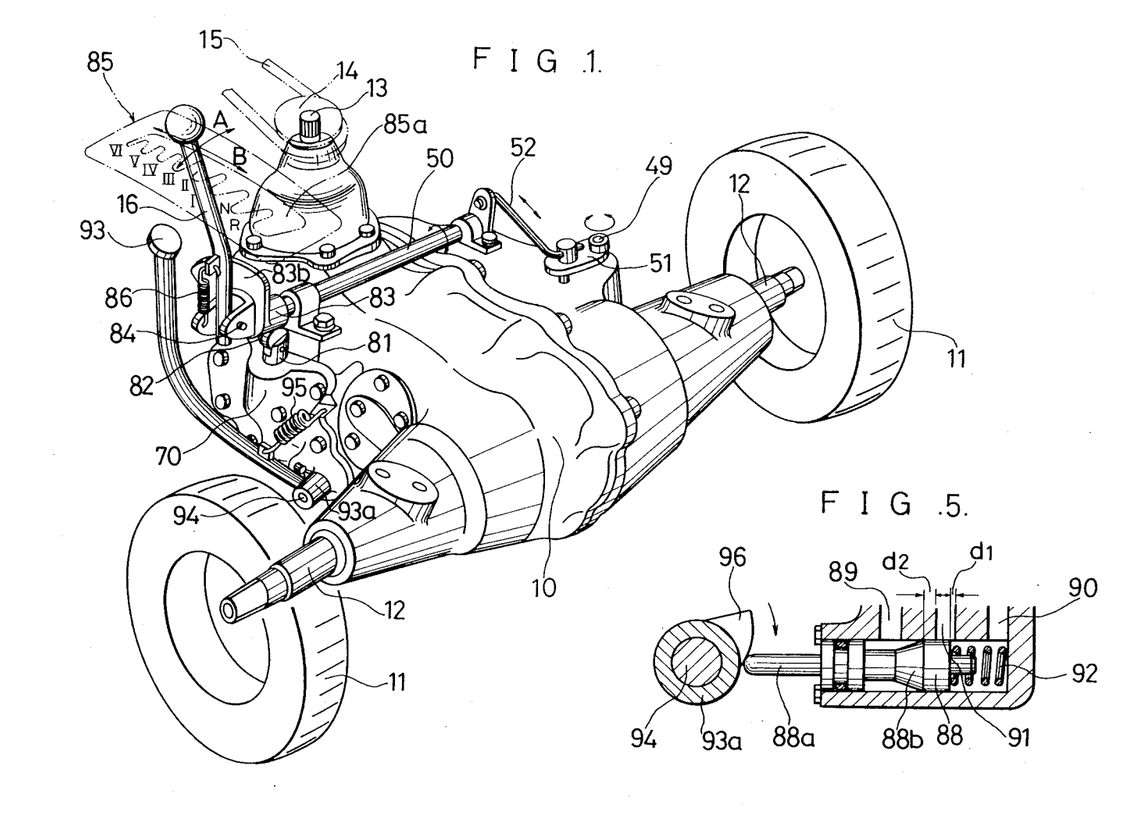
FIG. 1 is a perspective view of a transmission case and accessories therefor of a self-propelled working vehicle in which a first embodiment of the present invention is employed.
FIG. 5 is a sectional view showing a control valve and its operating mechanism employed in the first embodiment.

As shown in FIG. 1, a transmission case 10 is provided which is adapted to be mounted on a small-scaled working vehicle such as mower tractor. Left and right rear wheels 11 of the vehicle are supported at axles 12 thereof by the case 10. An input shaft 13 extending upwardly from the case has thereon a pulley 14 to which power is transmitted from engine (not shown) through a belt 15. A change lever 16 is provided at a side of transmission case 10 for operating speed change mechanism which will be detailed hereinafter.

Figures 2, 3:
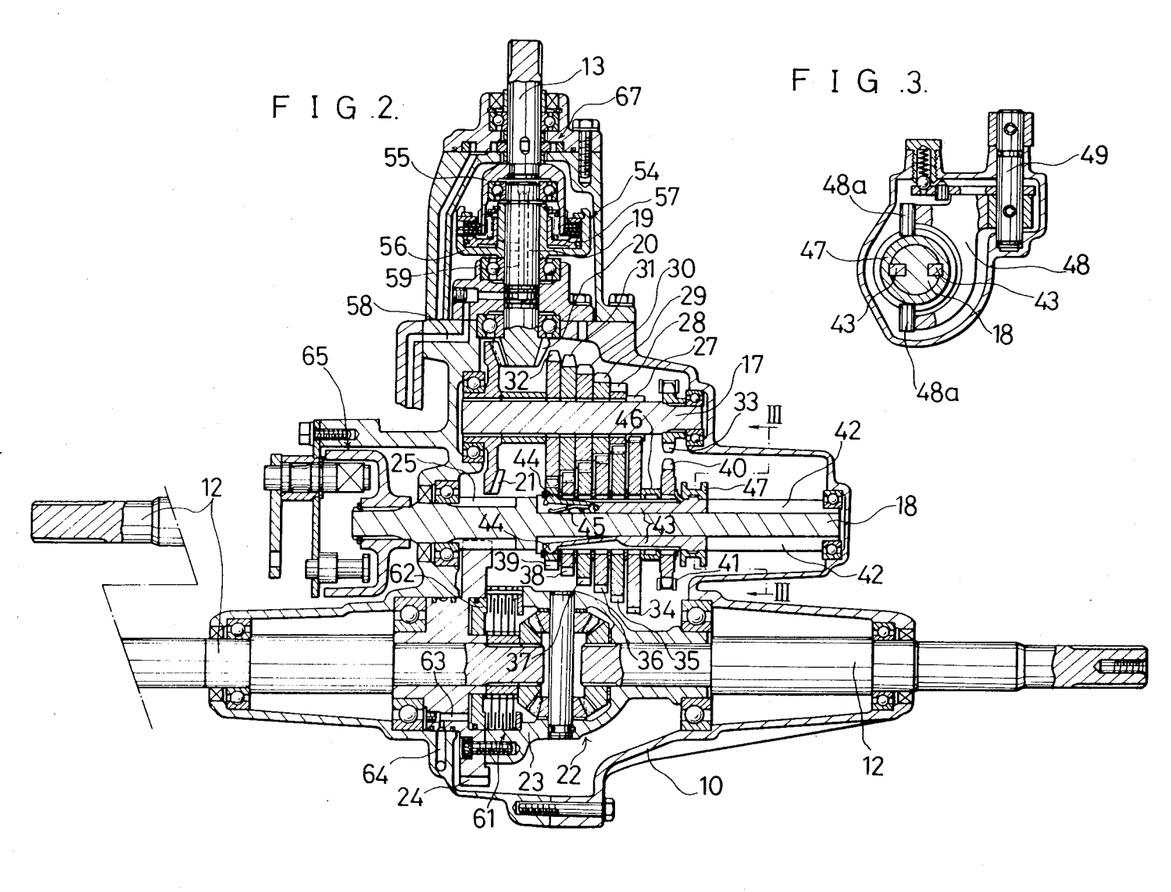
FIG. 2 is a sectional view, partially developed, of the transmission case shown in FIG. 1.
FIG. 3 is a sectional view taken along line III—III of FIG. 2.

As shown in FIG. 2, first and second shafts 17 and 18 are journaled within the case 10. These shafts are arranged in parallel with wheel axles 12. Transmission case 10 also journals an intermediate shaft 19 which is arranged coaxially with the input shaft 13. This shaft 19 has at the lower end thereof an integral bevel pinion 20 which is meshed with a bevel gear 21 fixedly mounted on one end portion of the first shaft 17. The transmission shown includes a differential gearing 22 having a casing 23 journaled within transmission case 10. Casing 23 has a large gear 24 affixed thereto which is meshed with a small gear 25 integrally formed to one end portion of the second shaft 18. A pair of driven pinions of the differential gearing 22 are fixedly mounted on the inner end portions of left and right wheel axles 12.

A plurality of or six change gears 27, 28, 29, 30, 31 and 32 and a sprocket gear 33 are fixedly mounted on the first shaft 17. A plurality of or six change gears 34, 35, 36, 37, 38 and 39 and a sprocket gear 40 are rotatably mounted on the second shaft 18. Change gears 27 to 32 on the first shaft 17 are meshed with change gears 34 to 39, respectively, so as to provide six forward direction change gear trains between the shafts 17 and 18. Over the sprocket gears 33 and 40 is entrained a chain 41 for providing a backward direction transmission train.

As also shown in FIG. 2, the second shaft is formed with a pair of axially extending grooves or keyways 42 each of which slidably receives an elongated shift key 43 having at one end thereof a clutch portion 44 biased to move radially outwardly of the shaft 18. Biasing of the clutch portion 44 may be achieved either by providing a separate clutch portion 44 pivotally connected to the remainder of key 43 and biased by a separate leaf spring 45, as shown in FIG. 2 with respect to one of the keys, or by providing an integral resilient clutch portion 44, as shown in FIG. 2 with respect to the other of keys. Each of the gears S4 to 40 has at its inner periphery an annular recess into which the clutch portions 44 may be projected so as to connect such gear non-rotatably to the second shaft. A similar recess is also formed to a neutral position collar 46 which is disposed between the forward direction first speed gear 34 and the backward direction sprocket gear 40.

The other or base ends of the pair of keys 43 are fixedly connected to a shift collar 47 which is slidably mounted on the second shaft 18. As shown in FIG. 3, a rotatable shift fork 48 is provided which is engaged at a pair of shift pins 48a affixed thereto to the shift collar 47. This shift fork 48 is fixedly secured to a rotatable control shaft 49 which extends at an upper end portion thereof outwardly of the transmission case 10. As shown in FIG. 1, the control shaft 49 is operatively connected to another rotatable control shaft 50 through a link mechanism having a rotatable link 51 and a slidable link 52. The latter control shaft 50 is rotated about its axis when the change lever 10 is moved along arrow B shown in FIG. 1, as will be detailed later.

As shown in FIG. 2, a fluid-actuated clutch 54 is disposed between the input shaft 13 and intermediate shaft 19. This clutch 54 is of multi-disc type having plural friction elements, which are slidably but non-rotatably supported by a hollow cylindrical transmission member 55 fixedly mounted on the input shaft 13, and plural another friction elements which are slidably but non-rotatably supported by a clutch cylinder 56 fixedly mounted on the intermediate shaft 19. A piston 57 biased to move towards a clutch-disengaging position by a return spring is disposed within the clutch cylinder 56 for engaging the clutch 54. When fluid under pressure is supplied into the cylinder 56 through fluid passages 58 and 59 formed in the transmission case and intermediate shaft, piston 57 is moved upwardly to a clutch-engaging position where frictional engagement between the friction elements is caused.

As also shown in FIG. 2, a fluid-operated clutch 61 is provided for selectively locking the differential gearing 22. This clutch 61 is also of the multi-disc type having one and another plural friction elements which are slidably but non-rotatably supported by the differential casing 23 and by one of the wheel axles 12, respectively. A piston 62 is disposed within the casing 23 for causing a frictional engagement between the friction elements. A fluid passage 63 is perforated in the gear 24 for supplying clutch-operating fluid under pressure towards the piston 02. Such fluid passage 63 is communicated at an annular groove portion thereof, located on the outer periphery of boss of the gear 24, to a fluid passage 64 in the transmission case 10.

One end of the second shaft 18 is projected outwardly of the transmission case 10 for providing a brake 65 to such shaft, as shown in FIG. 2.

Figure 4:
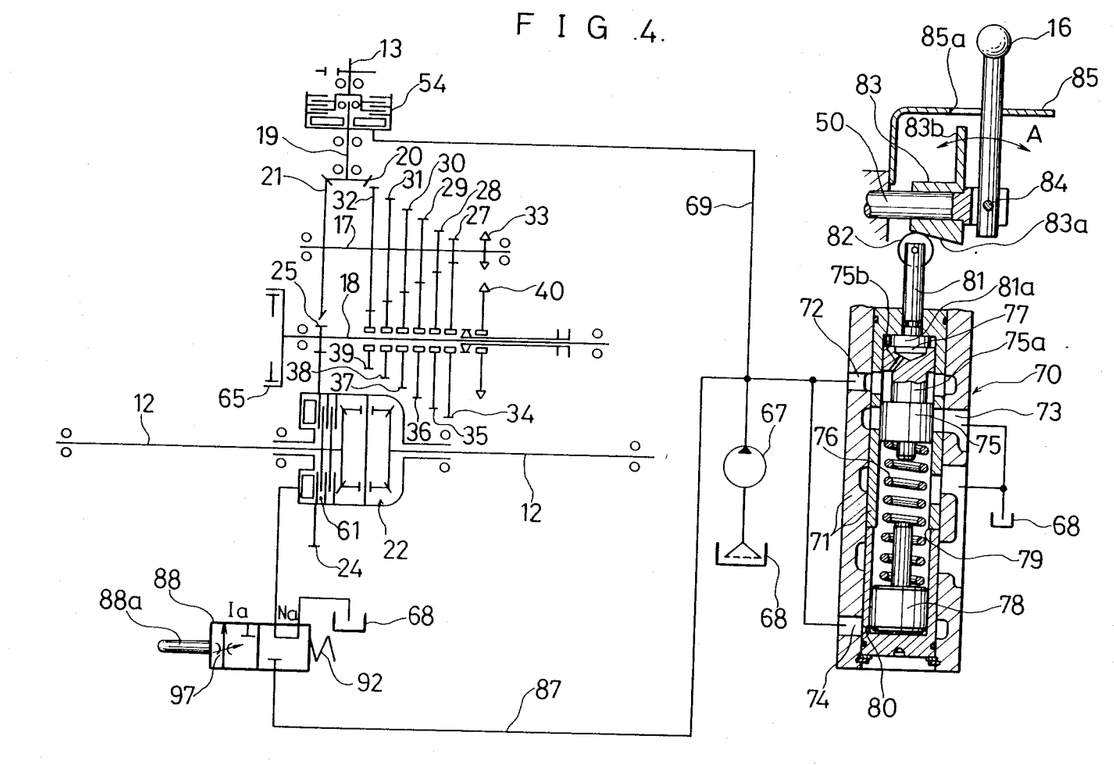
FIG. 4 is a schematic view showing the transmission mechanism, valves and operating mechanism therefor, and fluid circuit employed in the first embodiment.

FIG. 4 illustrates a fluid supply system for the clutches 54 and 61. A pump 67 is provided which operates to supply fluid under pressure from an oil tank 68 which is provided by a lower portion of transmission case 10. As shown in FIG. 2, this pump 67 is fashioned as a gear pump driven by the input shaft 13.

As shown in FIG. 4, pump 67 is connected to the fluid-actuated clutch 54 via a fluid supply path 69. To such fluid supply path 69 is connected a valve assembly 70 which acts as a fluid pressure-determining relief valve and also as an unloader valve for selectively unloading fluid pressure in the path 69, as will be detailed hereinafter.

The valve assembly 70 comprises a casing 71 which has an inlet port 72 connected to the supply path 69, an outlet port 73 connected to tank 68, and a control port 74 connected to the supply path 69. Within the casing 71 is slidably disposed a valve spool 75 which has a diameter-reduced portion 75a for communicating the inlet port 72 to the outlet port 73. Spool 75 is biased by a pressure-determining spring 76 to move towards a direction to cut off fluid communication between the inlet and outlet ports. Within the casing 71 is formed a fluid chamber 77 which is communicated to the inlet port 72 through a passage 75b provided in the spool 75. It is thus seen that spool 75 normally takes a position where fluid pressure in the chamber 77 is balanced with the biasing force of spring 76. Consequently, such spool 75 acts as a relief valve which establishes in the supply path 69 a fluid pressure corresponding to the biasing force of pressure-determining spring 76.

The base end of spring 76 is received by a control piston 78 which may advance from the most retreated position shown in FIG. 4 to a position determined by an annular stop 79 on the inner wall of casing 71 so as to enlarge the biasing force of spring 76. The Control port 74 includes an orifice 80 which opens behind the piston 78. It is thus seen that control piston 70 is advanced from the most retreated position by fluid supplied from the path 69 through control port 74 at a small rate determined by the flow area of orifice 80. Consequently, the biasing force of spring 76 is gradually enlarged so that fluid pressure in the supply path 69 is gradually enlarged to a predetermined valve corresponding to the biasing force of spring 76 at a state where control piston 78 takes the most advanced position determined by the stop 79.

Cam means is provided for providing a function of unloader valve to valve assembly 70 or the valve spool 75 thereof. This cam means comprises a slidable rod 81 which is disposed coaxially with spool 75 and is supported by the casing 71. Within the casing 71, rod 81 has an integral disk 81a to which valve spool 75 is engaged by the biasing force of spring 76. A cam follower or roller 82 is rotatably provided to the outermost end of rod 81. As shown in FIG. 1, this roller 82 is disposed below one end portion of the control shaft 50 set forth before. On such shaft 50 is slidably mounted a cam 83 having a sloped cam surface 83a which engages the roller 82, as shown in FIG. 4. Cam surface 83a is shaped such that when the cam 83 is displaced towards the left, as viewed in FIG. 4, such surface 83a pushes the roller 82 so as to move the rod 81 towards the valve spool 75 by a distance such that spool 75 is displaced to a position where the inlet port 72 is communicated to the outlet port 73 without any restriction of fluid flow. Such communication between the ports 72 and 73 will cause an unloding of fluid pressure in the supply path 69. It is thus seen that valve spool 75 acts as an unloader valve when operated by the cam means.

As shown in FIGS. 1 and 4, control shaft 50 has a forked end within which the change lever 16 is pivotally connected to the control shaft 50 by a horizontal pin 84 which extends along a direction perpendicular to the shaft 50. It is thus seen that change lever 16 is supported such that it may be moved or rotated along a direction shown by arrow A in FIGS. 1 and 4 about the pin 84 as well as along another direction shown by arrow B in FIG. 1 about the axis of control shaft 50. Control shaft 50 is not rotated when the lever 16 is moved along arrow A, whereas such shaft 50 is rotated when the lever 16 is moved along arrow B. As also shown in FIGS. 1 and 4, cam 83 has an integral plate portion 83b which is opposed to the lever 16 with a small interval therebetween so that when change lever 16 is moved along arrow A towards such plate portion 63a the lever 16 pushes the plate portion 83b to cause a displacement of cam 83 towards the left, as viewed in FIG. 4. Consequently, the unloader valve may be operated or actuated by change lever 16.

As shown in FIGS. 1 and 4, a lever guide 85 is fixedly provided. This guide 85 has therein a guide opening 85a through which change lever 16 extends. As shown in FIG. 1, guide opening 85a has a plurality of or eight notches which are arranged intermittently along the direction of arrow B. A spring 86 is provided which biases the lever 16 to move towards these notches in the direction along arrow A. When the lever 16 is moved along arrow B, it displaces the shift collar 47 shown in FIG. 2 through the shifter members 50, 52, 51, 49 and 48 along the second shaft 18 so as to displace the clutch portion 44 of key 43 selectively to one of a neutral position, where the portion 44 engages the neutral position collar 46, and seven operative positions where the portion 44 engages respective gears 34 to 40. The notches in the guide opening 85a are arranged such that their positions correspond to such neutral and operative positions of the clutch portion 44. Thus, the guide opening 85a has a neutral position notch N, forward direction first to sixth speed position notches I, II, III, IV, V, VI and backward direction position notch R at each of which the lever 16 may rest under the biasing of spring 86. Movement of change lever 16 along arrow B from a state where such lever rests at one of the notches is permitted only when the lever 16 has once been moved along arrow A against the biasing of spring 80 so as to displace the cam 83 resulting in an actuation of the unloader valve.

As shown in FIG. 4, the fluid supply path 69 is connected to the clutch 61 for locking the differential 22 via a branch path 87 in which a control valve 88 is incorporated. This valve 88 has a neutral position Na, where the branch path 87 is blocked at a midway thereof and clutch 61 is connected to the tank 68, and an operative position Ia where fluid under pressure is supplied from the supply path 69 to the clutch 61 via branch path 87.

Structure of the control valve 88 is illustrated in FIG. 5. Valve casing of this valve 88 has a pump port 89, tank port 90 and cluch port 91 which are connected to the fluid supply path 69, oil tank 68 and lock clutch 61 shown in FIG. 4, respectively. Valve 88 is biased by a spring 92 towards the neutral position shown in FIG. 5 where pump port 89 is isolated and clutch port 91 is communicated to tank port 90. For displacing the valve 88 to the operative position, a clutch pedal 93 shown in FIG. 1 is provided which is supported by the transmission case 10 rotatably about a pivot shaft 94 and is biased towards the position shown in FIG. 1 by a return spring 95. As clearly shown in FIG. 5, a tubular member 93a of the pedal 93 which is rotatably mounted on the shaft 94 has thereon a cam 96. Control valve 88 comprises an integral rod 88a which extends outwardly from the valve casing and engages an arch-shaped cam surface of the cam 96 under the biasing of spring 92 so that, when the pedal 93 is stepped down to cause a rotation of cam 96, valve 88 is pushed inwardly so as to be displaced towards the right, as viewed in FIG. 5. Valve 88 has a tapered portion 88b for providing a throttled fluid path between the pump port 89 and clutch port 91 when such valve 88 is displaced inwardly of the valve casing. When such displacement of the valve 88 is caused, communication between the clutch port 91 and tank port 90 is interrupted after a displacement of the valve of distance $d_1$ shown in FIG. 5 and communication between the pump port 89 and clutch port 91 is caused after a displacement of the valve of distance $d_2$ shown in FIG. 5. As can be seen from FIG. 5, relationship between such distances $d_1$ and $d_2$ is predetermined such that distance $d_1$ is larger than distance $d_2$ ($d_1 > d_2$) so that pump port 89 is communicated to the clutch port 91 after the communication between the clutch port 91 and tank port 90 has been interrupted. Communication between the pump port 89 and tank port 90 via clutch port 91 is thus prevented with certainty, that contributes to prevent the fluid supply path 69 from being connected once to tank 68 via the control valve 88. Tapered portion 88b of the valve 88 provides a variable area throttle 97 shown in FIG. 4 flow area of which may be varied by varying the amount of pedal-stepping down so as to vary distance of the inward displacement of valve 88.

The transmission shown in FIGS. 1 to 5 operates as follows:

For starting the vehicle or for changing the vehicle speed, operator on the vehicle moves the change lever 16 from one of the notches N, I-VI, R along the direction of arrow A shown in FIG. 1 so as to obtain a condition that movement of such lever 16 along the direction of arrow B shown in FIG. 1 is permitted. By this, cam means 81–83 shown in FIG. 4 is actuated so that valve spool 75 is displaced so as to unload fluid pressure in the supply path 69. Consequently, fluid-actuated clutch 54 in the transmission path is disengaged whereby transmission of power to the speed change mechanism is interrupted. In addition to this, fluid is drained through the control port 74 under the biasing force of spring 76 acting upon control piston 78 so that piston becomes retreated.

Operator on the vehicle then moves the change lever 16 along the direction of arrow B shown in FIG. 1 so as to place it to a position faced to a fresh notch and removes his hand form the lever. Change lever 16 is thus moved by the spring 86 into the fresh notch in a locked condition. By such shifting operation, the clutch portion 44 of shift key 43 shown in FIG. 2 is displaced to a fresh position where it engages one of the gears 34–40 so as to connect same to the second shaft 18. Pressure-unloading operation of the valve spool 75 continues during the shifting operation and stops when the lever 16 enters a fresh notch.

From the time when the pressure-unloading operation stops, control piston 78 shown in FIG. 4 is supplied with fluid from the path 69 through orifice 80 so that such piston 78 is advanced gradually towards the spring 76 so as to enlarge the biasing force of such spring gradually. Fluid pressure in the supply path 69 is thus enlarged gradually to cause a gradual engagement of the clutch 54. Such engagement will proceed in a manner such that the clutch 54 is firstly engaged in a slipping condition and is then brought gradually into a full engagement condition. Torque transmitted through such clutch 54 to the speed change mechanism is increased gradually so that the clutch portion 44 shown in FIG. 2 is not subjected to a sudden increase of torque or load. Full engagement condition of the clutch 54 is maintained by a predetermined normal operating fluid pressure which corresponds to the biasing force of pressure-determining spring 76 in the condition that control piston 78 abuts upon the stop 79 shown in FIG. 4.

When locking of the differential gearing 22 is desired, operator on the vehicle steps down the pedal 93 shown in FIG. 1. By this, control valve 88 shown in FIGS. 4 and 5 is displaced to the operative position Ia so that fluid under pressure is supplied to the locking clutch 61 to cause an engagement of such clutch. This clutch 61 operates, when engaged, to connect between the differential casing 23 and one of the wheel axles 12 so as to limit the differential operation.

When the locking clutch 61 is operated, throttle 97 shown in FIG. 4 will limit flow rate towards the clutch 61 so that fluid pressure in the supply path 69 is not dropped so much. Slipping or disengagement of the fluid-actuated clutch 54 in the transmission path is thus not caused. Consequently, an unexpected or sudden speed-down or stop of the vehicle is avoided. Differential-limiting operation by the locking clutch 61 may be adjusted or controlled by varying the amount of pedal-stepping down so as to vary or adjust flow area of the variable area throttle 97.

Figure 6:
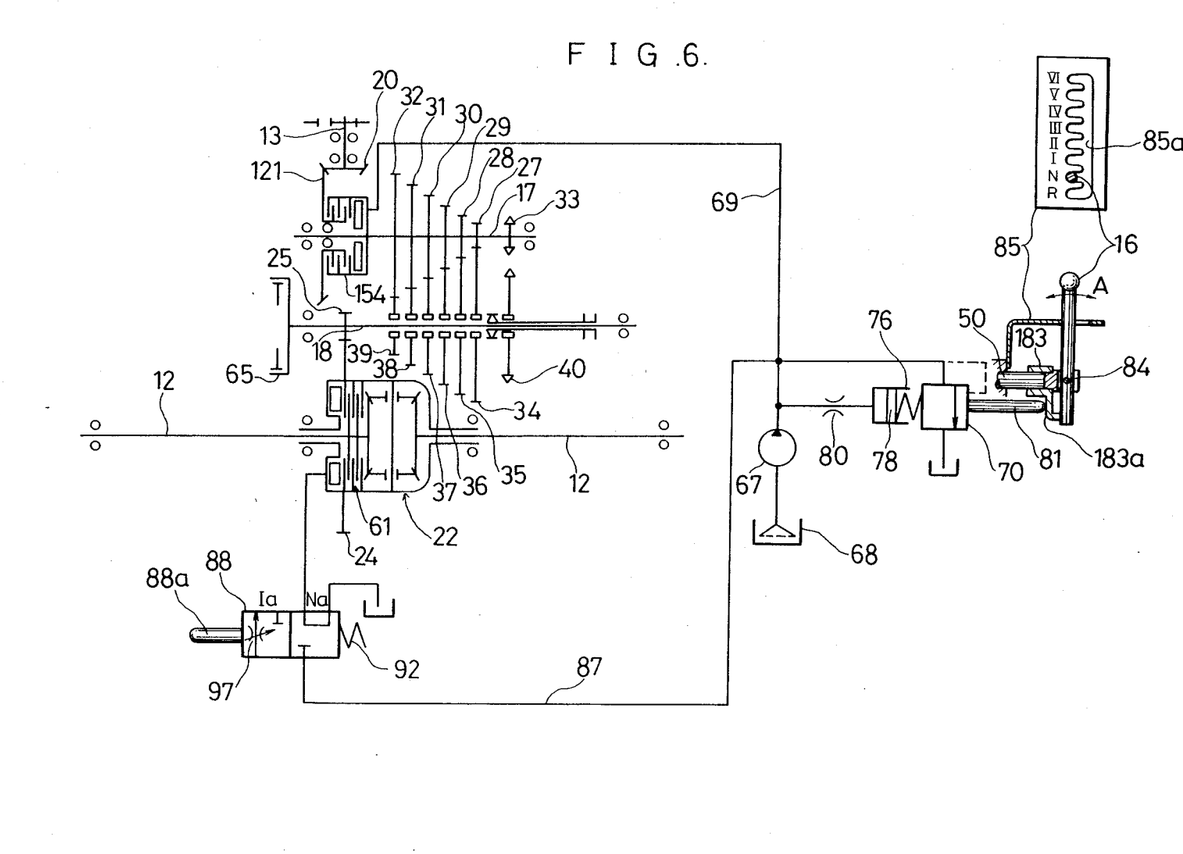
FIG. 6 is a schematic view illustrating various parts and connection therebetween employed in a second embodiment of the present invention.

In FIG. 6, there is shown a second embodiment of the transmission according to the present invention.

In this second embodiment, a bevel gear 121 which corresponds to the bevel gear 21 employed in the first embodiment is rotatably mounted on the first shaft 17. A fluid-actuated clutch 154 which corresponds to the clutch 54 in the first embodiment is arranged between the bevel gear 121 and first shaft 17. Intermediate shaft 10 is not provided and a bevel pinion 20 on the input shaft 13 is meshed with the bevel gear 121.

Cam means employed in the second embodiment shown in FIG. 6 comprises a cam 183 which is slidably mounted on the control shaft 50, too. This cam 183 has a depending portion 183a which engages the rod 81 directly. Cam 183 is fashioned such that when the change lever 16 is moved along arrow A towards the right as viewed in FIG. 6, it is pushed by a lower end portion of such lever 16 so as to displace the rod 81 towards a direction of actuating the unloader valve.

The other parts of the second embodiment are constructed similarly and are designated by like numerals.

Figure 7:
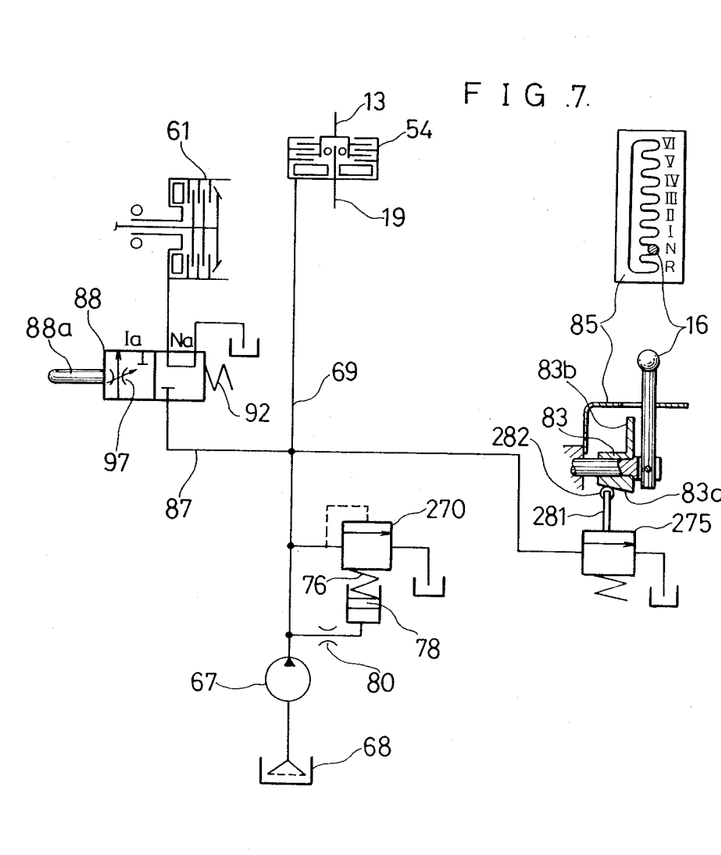
FIG. 7 is a schematic view similar to FIG. 6 but showing a third embodiment of the present invention.
Figure 8:
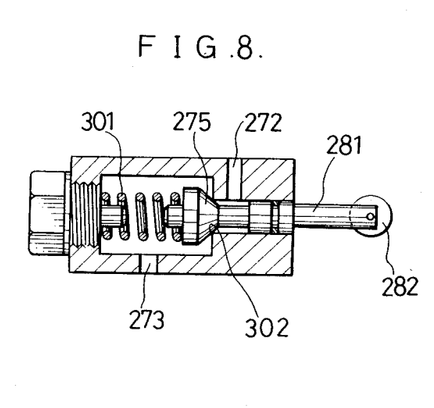
FIG. 8 is a sectional view of an unloader valve employed in the third embodiment.

In FIGS. 7 and 8, there is shown a third embodiment of the transmission according to the present invention.

In this embodiment, a relief valve 270 and an unloader valve 275 are separately provided. Relief valve 270 comprises pressure-determining spring 76 and control piston 78.

As shown in FIG. 8, unloader valve 275 is shaped to a poppet having an integral rod 281. Such poppet 275 is biased by a valve spring 301 so as to engage a valve seat 302 between an inlet port 272 and outlet port 273. Rod 281 has at its outermost end a roller 282. This roller 282 engages under the biasing of valve spring 301 a cam 83 which is fashioned similarly with the cam 83 employed in the first embodiment, as can be seen from FIG. 7.

We claim:

1. In a transmission for self-propelled working vehicles, having a speed change mechanism which comprises: a plurality of first change gears fixedly mounted on a first shaft; a plurality of second change gears rotatably mounted on a second shaft, said second shaft being arranged in parallel with said first shaft and said second change gears being meshed with said first gears, respectively; key means disposed within said second shaft and slidable axially of the said shaft, said key means having a clutch portion biased to move radially outwardly of said second shaft and engageable with each of said second change gears so as to connect same non-rotatably to said second shaft; and a shift mechanism operatively connected to said key means for displacing same to a plurality of operative positions where said second change gears are coupled one at a time to said second shaft by said clutch portion, said shift mechanism including a change lever for operating same, the improvement comprising:
 a fluid-actuated clutch operable to interrupt input of power to said speed change mechanism when disengaged;
 a pump connected to said clutch via a fluid supply path for supplying fluid under pressure so as to engage said clutch;
 relief valve means connected to said fluid supply path and having a spring for determining fluid pressure applied to said clutch, a base end of said spring being received by a control piston movable axially of said spring between two positions,
 said control piston being adapted to be moved towards said spring by fluid supplied from said fluid supply path through an orifice; and
 an unloader valve connected to said fluid supply path and operable to unload fluid pressure in said fluid supply path when displaced to a pressure-unloading position,
 said change lever being supported so as to be movable along a first direction and along a second direction, said unloader valve being connected operatively to said change lever so as to be displaced to said pressure-unloading position by a movement of said change lever along said first direction, and said shift mechanism being adapted to be operated when said change lever is moved along said second direction.

2. The transmission as claimed in claim 1, in which cam means is disposed between said change lever and said unloader valve, said cam means being operative to displace said unloader valve to said pressure-unloading position when actuated and being adapted to be actuated by said movement of said change lever along said first direction.

3. The transmission as claimed in claim 1 or 2, in which a lever guide is provided having guide means which permits a movement of said change lever along said second direction only when said change lever has been moved along said first direction so as to displace said unloader valve to said pressure-unloading position.

4. The transmission as claimed in claim 1, in which said relief valve means comprises an inlet port connected to said fluid supply path, an outlet port connected to a tank, and a valve spool disposed between said inlet port and said outlet port, said valve spool being biased by said spring so as to control fluid communication between said inlet and outlet ports and to thereby determine fluid pressure applied to said clutch in cooperation with said spring; and
 in which cam means is provided which engages at one end thereof to said valve spool from a direction opposite to said spring, said cam means being adapted to be moved towards said valve spool by said movement of said change lever along said first direction to cause an unristricted fluid communication between said inlet and outlet ports, whereby said unloader valve is provided by said valve spool.

5. The transmission as claimed in claim 1, which further comprises a differential gearing and a fluid-operated clutch for locking said differential gearing, said fluid-operated clutch being connected to said fluid supply path via a branch path having therein a throttle and a control valve for controlling operation of said fluid-operated clutch.

6. The transmission as claimed in claim 5, in which said throttle is incorporated in said control valve in a fashion such that said throttle is actuated when said control valve is displaced to a position for supplying fluid to said fluid-operated clutch.

7. The transmission as claimed in claim 6, in which said throttle is fashioned such that flow area thereof is enlarged by a displacement of said control valve towards said position for supplying fluid to said fluid-operated clutch.

* * * * *